United States Patent
Bogani

(10) Patent No.: US 6,341,714 B1
(45) Date of Patent: Jan. 29, 2002

(54) SEPARABLE COUPLING BETWEEN A HANDLE AND POTS AND PANS

(75) Inventor: Giuseppe Bogani, Limbiate (IT)

(73) Assignee: Angelo Campana S.r.L. (IT)

( * ) Notice: Subject to any disclaimer, the term of this patent is extended or adjusted under 35 U.S.C. 154(b) by 0 days.

(21) Appl. No.: 09/807,597

(22) PCT Filed: Oct. 12, 1999

(86) PCT No.: PCT/EP99/07907

§ 371 Date: Apr. 13, 2001

§ 102(e) Date: Apr. 13, 2001

(87) PCT Pub. No.: WO00/21422

PCT Pub. Date: Apr. 20, 2000

(30) Foreign Application Priority Data

Oct. 14, 1998 (IT) ........................ MI980664 U

(51) Int. Cl.[7] ............................... B65D 25/28
(52) U.S. Cl. ........................... 220/759; 16/425
(58) Field of Search ................ 220/759; 16/425

(56) References Cited

U.S. PATENT DOCUMENTS

| | | | | |
|---|---|---|---|---|
| 1,268,089 A | * | 6/1918 | Borsee | 220/759 |
| 1,277,182 A | * | 8/1918 | Borsee | 220/759 |
| 1,406,826 A | * | 2/1922 | Dugger | 220/759 |
| 1,818,284 A | * | 8/1931 | Stephens | 220/759 |
| 4,206,853 A | * | 6/1980 | Iten et al. | 220/759 |
| 6,250,493 B1 | * | 6/2001 | Kwan | 220/759 |

FOREIGN PATENT DOCUMENTS

| | | | |
|---|---|---|---|
| CH | 548190 | * | 4/1974 |
| EP | 0852924 | * | 7/1998 |
| FR | 2069480 | * | 7/1971 |

* cited by examiner

Primary Examiner—Stephen Castellano
(74) Attorney, Agent, or Firm—Shlesinger, Fitzsimmons & Shlesinger

(57) ABSTRACT

A metal bracket, which is secured to the outer surface of a pan, has therethrough a hole for accommodating a tongue shaped projection which is fixed to and projects from one end of a handle that is releasably secured to the bracket. The tongue shaped projection is releasably secured to the bracket by a cam which is rotatable manually to secure the projection in the hole, or to permit removal thereof from the hole to disengage the handle from the pan.

7 Claims, 2 Drawing Sheets

SEPARABLE COUPLING BETWEEN A HANDLE AND POTS AND PANS

BACKGROUND OF THE INVENTION

Figure 1:
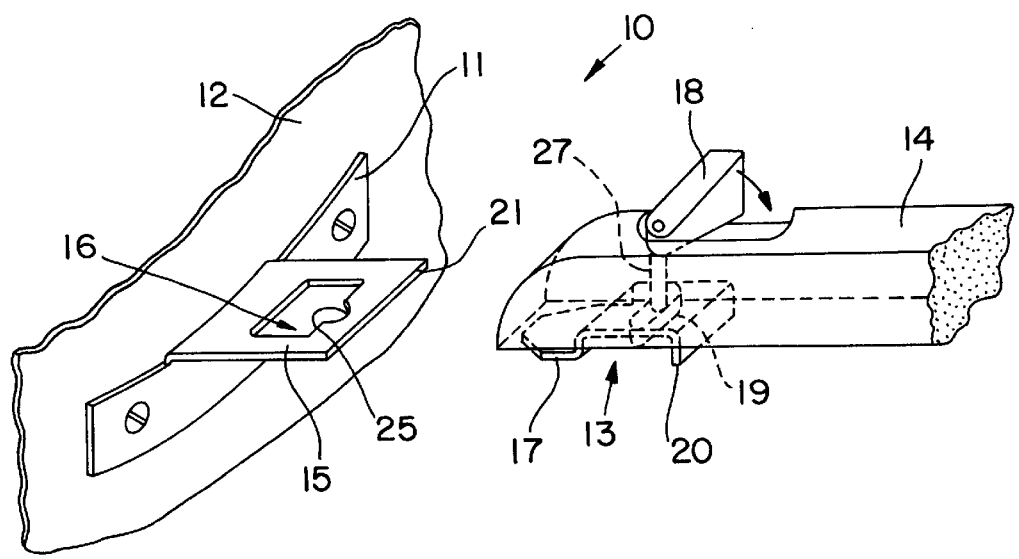

The present invention relates to a separable coupling for removable engagement of a handle with a pan. The term "pan" refers to any utensil such as pans, casseroles, true pots and pans et cetera.

EP-A-0 852 924 discloses a separable coupling for connecting a handle and a pan, which comprises a first member fixable to the pan and a second member fixable to the handle. Said second member has a tongue which can be inserted into a hole provided in a bracket projecting from the first member. An elastically slidable locking means is mounted on said second member in order to keep the first member and second member in the coupled condition. However, the couplings according to the known art have been found not very easy to handle and generally do not ensure a satisfactory level of safety.

SUMMARY OF THE INVENTION

The general purpose of the present invention is to make available a coupling low in cost, safe and easy to handle. I view of this purpose it is sought to provide in accordance with the present invention a separable coupling for removably connecting a handle to a pan comprising a first member fixable to the pan and a second member fixable to the handle with the first member comprising a projecting bracket with a hole passing therethrough and the second member comprising a tongue to be inserted in the coupled condition in to said hole so as to traverse it and lie parallel with and beneath the bracket and means for locking the first member to the second member when the tongue is inserted into said hole, characterized in that said means for locking the first member to the second member comprises a cam member which is mounted on the second member to be rotatable towards a locking position in order to press with its first cam surface on an edge of said hole thereby constraining said bracket between said first cam surface and a facing projection of the second member.

To clarify the explanation of the innovative principles of the present invention and its advantages compared with the prior art there is described below with the aid of the annexed drawings a possible embodiment thereof by way of non-limiting example applying said principles. In the drawings:

THE DRAWINGS

Figure 2:
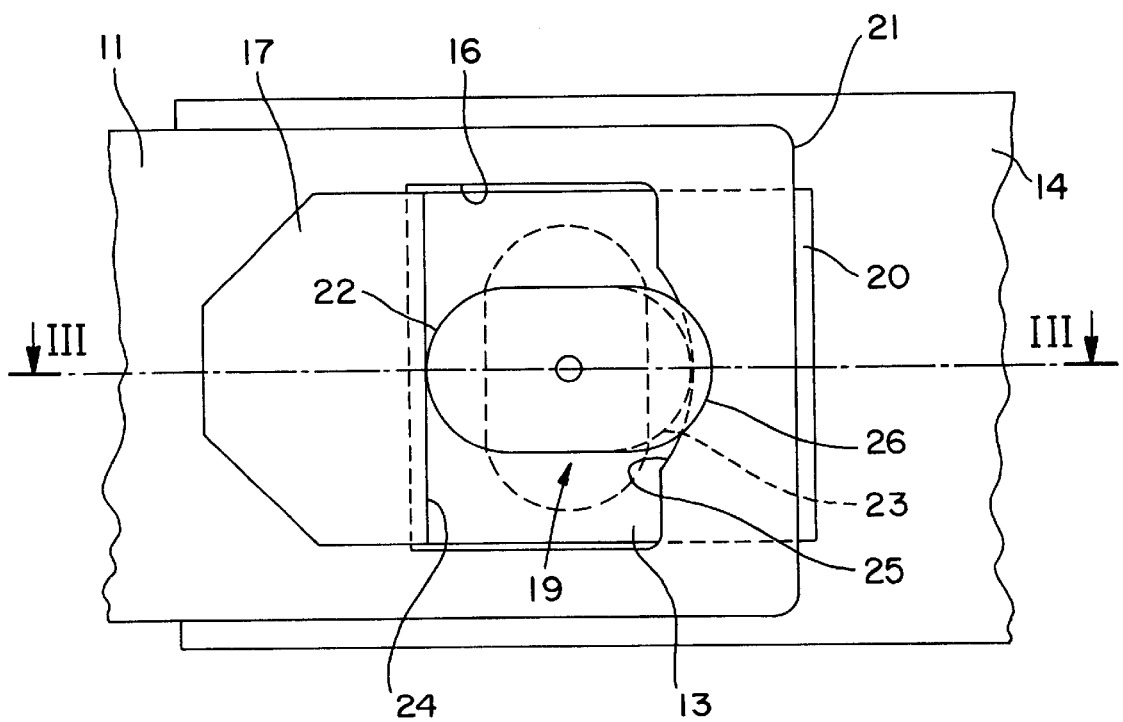
Figure 3:
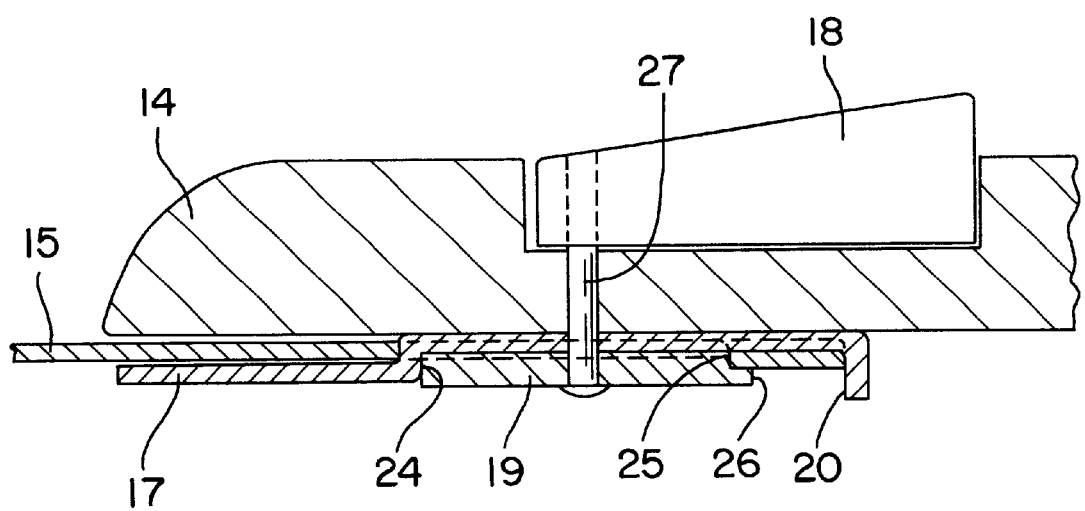

FIG. 1 shows a diagrammatic perspective view of a device in accordance with the present invention for coupling between a pan and a handle, FIG. 2 shows a bottom view of the coupling of FIG. 1, and FIG. 3 shows a outaway view along plane of out III—III of FIG. 2.

DETAILED DESCRIPTION OF THE PREFERRED EMBODIMENTS

With reference to the figures a coupling indicated as a whole by reference number 10 comprising a first engagement member 11 fixed on the pan 12 and a second member 13 fixed to the handle. The test of the pan and the handle can have any known form and will not be further shown or described here.

The member 11 has a rectangular bracket 15 projecting laterally from the pan and having a generally rectangular hole 16 for passage of a tongue 17 projecting forward from the second member 13. The second member 13 also comprises a cam member 19 driven by a lever 18 through a pine 27. As shown in FIGS. 2 and 3 the engagement member on the handle as the front tongue 17 offset downward end has an extension permitting passage through the rectangular hole 16 in the engagement part fixed to the pan to lie parallel to and beneath the latter. The engagement part fixed to the handle has a rear projection 20 designed to be a striker for the leading edge 21 of the part 15 and a parallel from projection 24.

The cam member 19 rotates between the front and rear projections 20, 24 and has a first cam end 22 and a second cam end 23 opposite. Upon rotation of the lever (18) towards the engagement locking position the cam member 19 moves from the broken line position to the solid line position shown in FIG. 2. The cam surface 22 pressess against the front edge 24 while the came surface 23 pressess against an opposite rounded edge 25 of the hole 16 so as to press the edge 21 of the bracket 15 against the surface 20.

The bracket thus is scarfed between the cam surface 23 and the projection 20. This prevents handle and pan movements against each other. The cam surface 22 prevents excessive stress on the pin 27. The cam 23 has a step 26 which in the locking position moves beneath the edge 25 so as to make withdrawal of the part 17 from the part 15 impossible.

Advantageously in the releasing position the lever 18 projects laterally to the handle while on the locking position it is parallel to and inside the handle with the upper part projecting for movement to the releasing position.

It is now clear that the preset purposes have been achieved. In the releasing position (FIG. 1) the handle is easily engageable with or disengageable from the pan while a simple rotation of the lever (18) towards the locking position (FIGS. 2 and 3) ensures steady coupling with no possibility of even the smallest reciprocal movements.

To reduce costs the first and second members can be advantageously made from blanked and bent sheet metal. Naturally the above description of an embodiment applying the innovative principles of the present invention is given by way of non-limiting example of said principles within the scope of the exclusive right claimed here.

For example although the front engagement shown in the figures is preferable the engagement between the parts and the cam action direction can be different e.g. transversal to the handle extension as readily imaginable to one skilled in the art. The cam could also press from the outside of the bracket instead of from the inside of the hole therein.

In addition the coupling members can be provided by die casting, pressing, blanking et cetera and of different materials. The tongue member can also be in a single piece with the handle. The handle itself can be of any shape and not necessarily the elongated type. For example it can be of the hand lever type. It is also possible to provide an interchangeable elongated handle and a hand lever on the same pan.

What is claimed is:

1. Separable coupling for removably connecting a handle (14) to a pan (12) comprising a first member (11) fixable to the pan and a second member (13) fixable to the handle with the first member (11) comprising a projecting bracket (15) with a hole (16) passing theregthrough and the second member (12) comprising a tongue (17) to be inserted in the coupled condition into said hole (16) so as to traverse it and lie parallel with and beneath the bracket and means (19) for locking the first member (11) to the second member (13)

when the tongue (17) is inserted into said hole (16) characterized in that said means for locking the first member (11) to the second member (13) comprises a cam member (19) which is mounted on the second member (13) to be rotatable towards a locking position in order to press with its first cam surface (23) on an edge (25) of said hole (16) thereby constraining said bracket (15) between said first cam surface (23) and a facing projection (20) of the second member (13).

2. Separable coupling according to claim 1, characterized in that the cam member (19) has a second cam surface (22) opposite the first one and pressing when in locking position on a surface (24) of the second member which is opposite said projection (20).

3. Separable coupling according to claim 1 characterized in that the cam member (19) has a step (26) beneath the first cam surface (23) and lies in locking position beneath the edge (25) of the hole (16) on which the first cam surface (23) presses.

4. Separable coupling according to claim 1, characterized in that the edge (25) of the hole on which the first cam surface (23) presses is opposite the tongue (17) projecting from the second member.

5. Separable coupling according to claim 1, characterized in that the hole (16) is generally rectangular with the side (25) on which presses the first cam surface (23) displaying a rounding.

6. Separable coupling according to claim 1, characterized in that the cam member (19) is connected for operation to a lever (18) projecting laterally from the handle when in the releasing position.

7. Separable coupling according to claim 1, characterized in that the first (11) and second (13) members are made of blanked and bent sheet metal.

* * * * *